July 28, 1959  R. GLICKSMAN ET AL  2,897,249
PRIMARY CELLS
Filed Dec. 17, 1957  2 Sheets-Sheet 1

INVENTORS
RICHARD GLICKSMAN &
CLARENCE K. MOREHOUSE
BY
ATTORNEY

INVENTORS
RICHARD GLICKSMAN &
CLARENCE K. MOREHOUSE
BY
ATTORNEY ized July 28, 1959

2,897,249

PRIMARY CELLS

Richard Glicksman, Highland Park, and Clarence K. Morehouse, Princeton, N.J., assignors to Radio Corporation of America, a corporation of Delaware Application December 17, 1957, Serial No. 703,331

25 Claims. (Cl. 136—102)

This invention relates to primary and reserve cells, and more particularly to improved primary and reserve cells including a cathode comprising a positive polyvalent iodine organic compound.

Primary cells are devices which convert stored chemical energy directly into electrical energy by an electrochemical process. Generally, the term primary cells refers to the class of cells in which the chemical reactions are not efficiently reversible. Cells having efficiently reversible chemical reactions are known as storage cells, or secondary cells, and may be recharged and used again. Primary cells are discarded once the chemical energy is converted to electrical energy. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply in any one of a variety of applications should have the following characteristics: long shelf life; low cost; a high flat operating voltage over a wide range of current drains; a high rate at which electrical energy can be withdrawn per unit of cell volume and weight; and a large capacity of electrical energy that can be withdrawn per unit of cell volume and weight.

Primary cells at present include materials which may come into short supply in times of emergency because the materials become critical to other important interests of the United States. These materials may become critical because they are supplied from foreign sources, or because sources are limited in size and capacity, or for some other economic reason.

An object of this invention is to provide an improved electrochemical system which may be employed in primary and reserve cells.

Another object of this invention is to provide improved primary cells including materials which are non-strategic, are readily available in the United States, and are comparatively inexpensive.

A further object is to provide improved primary cells having a relatively high flat operating voltage over a wide range of current drains.

Still another object is to provide improved primary cells having a high watt-hour and a high ampere-hour capacity per unit of cell volume and per unit of weight.

These and other objects and advantages are obtained by the instant invention which provides improved primary and reserve cells with a cathode including a depolarizer consisting of an organic oxidizing substance in which the oxidizing properties are due at least in part to polyvalent iodine chemically combined in said substance. In substances of this type the iodine is directly bonded to carbon, and is always in a positive oxidation state. Suitable anodes for the practice of the invention may consist of zinc, aluminum or magnesium, or alloys containing these elements as the base. The invention includes cells of the dry type, and the reserve type previously mentioned which are adaptable to supply electrical energy upon the addition of the electrolyte. Suitable electrolytes include aqueous solutions of metal halides.

The invention will be described in greater detail in connection with the accompanying drawings, in which.

EXAMPLE I

Figure 1:
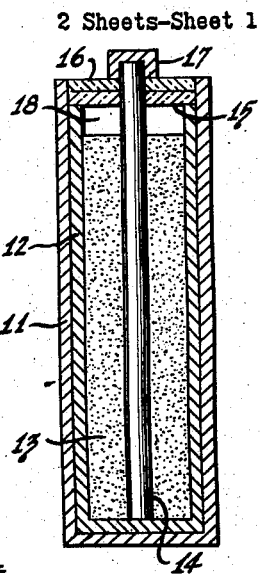
Figure 1 is a cross-sectional elevational view of a typical dry cell according to the invention.

Referring to Figure 1, a dry cell 10 of conventional design may be prepared as follows: a metallic anode 11 is provided in the form of a cup of a standard "AA" size, or other standard size such as "D" (American Standards Association, Bureau of Standards, Washington, D.C.). The anode metal is selected from the group consisting of zinc, magnesium, aluminum or alloys containing over 50% of these elements. In this example, the anode is an "AA" size cup of a magnesium base alloy having the approximate composition 98.4% magnesium, 1% aluminum, 0.5% zinc, and 0.10% calcium. This alloy composition is sometimes designated as AZ10A. The anode 11 is lined with a separator 12 comprising an absorbent kraft paper. Within the compartment, of which the separator 12 now forms the outer wall, is an anode mix 13 of materials comprising a cathode depolarizer, an ingredient for increasing the conductivity of the composition, an electrolyte, and a corrosion inhibitor. The separator 12 keeps the anode 11 and cathode 13 apart while providing therebetween a low resistance path to the flow of ions during the electrochemical process.

The mixture 13, including the cathode material and electrolyte, hereinafter referred to as the cathode mix, is prepared of the following constituents in the proportions indicated:

7.0 grams iodoxybenzene as the cathode depolarizer
3.5 grams Cabot Battery Black to increase the conductivity of the cathode composition
0.6 gram barium chromate to inhibit corrosion
12 ml. of an electrolyte consisting of an aqueous solution containing 371 grams $MgBr_2 \cdot 6H_2O$ and 1 gram $Li_2CrO_4 \cdot 2H_2O$ per liter of water Approximately 4.5 grams of the cathode mix is formed as a cylinder slug or bobbin and inserted in the paper lined anode 11 to form the cathode. The paper lining or separator 12 is composed of Nibroc salt-free kraft paper. A carbon rod 14 is inserted into the mix 13 to provide electrical connection thereto. The anode 11 is sealed by an insulating washer 15 mounted on the carbon rod, and a layer 16 of hard wax on the washer. The wax may for example be a high melting paraffin or a tar base material such as Amperole 8. A metal contact cap 17 of brass is placed on carbon rod 14. An air space 18 is provided between the washer 15 and the cathode 13. The anode and cathode may now be connected through an external load. The cell then commences to deliver current by electrochemical action.

Figure 2:
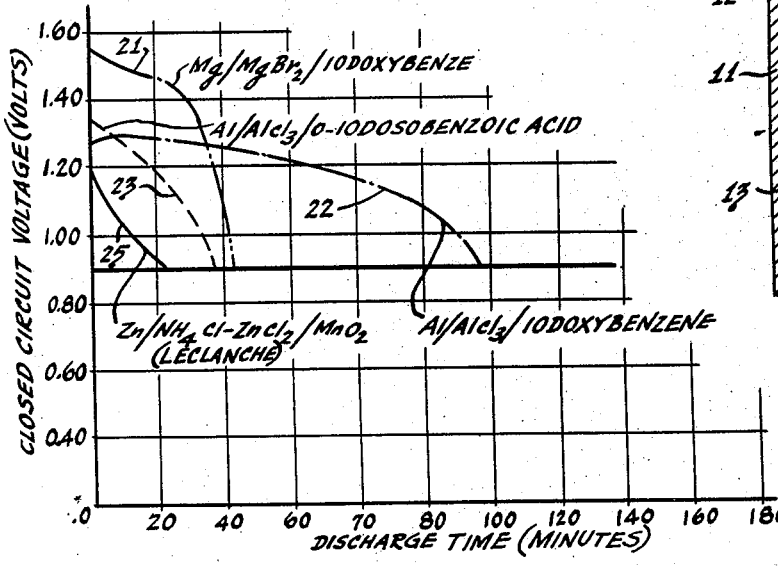
Figure 2 is a set of curves showing the change in cell voltage with respect to discharge time of three "AA" size dry cells of the invention, together with a comparable prior art dry cell, when discharged continuously through a four ohm resistance.

Figure 2 shows characteristic initial discharge curves of three "AA" size dry cells according to the invention when discharged continuously through a four ohm load resistance. Curve 21 shows a characteristic discharge curve for a cell prepared according to Example I, and containing iodoxybenzene as the cathode material together with a magnesium anode. For comparison, curve 25 shows the characteristic discharge curve for a similar commercially-available zinc/manganese dioxide (Leclanche) cell discharged under the same conditions. The dry cell of Example I operates at a considerably higher voltage than the comparable prior art zinc/manganese dioxide cell. Furthermore the cell of Example I has a much longer lifetime before it declines to an 0.9 volt cutoff voltage.

In addition to its favorable performance the cell of Example I has the advantage that it employs non-strategic materials which are relatively easy to manufacture in the United States. Magnesium and iodine may both be obtained from the sea. Aluminum may be obtained from clay. Battery blacks such as graphite and acetylene black are also available from sources within the United States.

The primary cells of the invention comprise generally the following parts:

(1) an anode selected from the group of materials consisting of magnesium and magnesium-base alloys, aluminum and aluminum-base alloys, zinc and zinc-base alloys, (2) a cathode including a depolarizer consisting of an organic oxidizing substance in which the oxidizing properties are due at least in part to polyvalent iodine in the positive oxidation state chemically combined in said substance. Other organic and inorganic oxidizing substances may also be used together with the iodine compounds. The cathode may also include other materials such as finely divided carbon, for example, carbon blacks such as Shawinigan acetylene black, G. Cabot experimental battery black, Atlas Powder Co. Darco G-60, and Acheson graphite No. 615, for increasing the conductivity of the cathode and for holding the electrolyte, (3) an electrolyte which may for example be an aqueous solution of a metal halide. The electrolyte may also include a material for inhibiting the corrosion of the anode.

The anode

The anode for the primary cells of the invention may consist of zinc or zinc-base alloys, aluminum or aluminum-base alloys, and magnesium or magnesium-base alloys. While any magnesium-base alloy having more than 50% magnesium may be used, it is preferable to have as high a proportion of magnesium as possible. Other ingredients are added to magnesium to improve the properties of the anode for fabrication purposes, to impart a greater degree of corrosion resistance, or for other reasons. Table I sets forth examples of magnesium-base alloys which are suitable for anode material, together with the corresponding ASTM designations.

TABLE I.—ANODE COMPOSITIONS

| Alloy No. | A.S.T.M. Designation | Nominal Composition [1] | | | | | |
|---|---|---|---|---|---|---|---|
| | | Al | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10.0 | 0.1 | | | | |
| 5 | A12 | 12.0 | 0.1 | | | | |
| 5a | AZ10A | 1.0 | | 0.5 | | | 0.10 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 9.0 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | ZI | | | 1.0 | | | |

[1] Balance commercial magnesium.

The magnesium anode may be the container for the cell, may be the lining of the container, or may be a separate structure inserted in the container. The magnesium anode may be in any geometrical configuration desired.

Similarly, any aluminum-base alloy having more than 50% aluminum may be used, but it is preferable to have as high a proportion of aluminum as possible. Other ingredients are added to aluminum to improve the properties of the anode for fabrication purposes, to impart a greater degree of corrosion resistance, or for other reasons. Table II sets foth examples of aluminum-base alloys which are suitable for anode material, together with the corresponding designations.

TABLE II

| Alloy and Temper | Composition |
|---|---|
| 2S-O | "Commercially pure" aluminum. |
| 2S-H | Do. |
| 3S-O | Al+1.2% Mn. |
| 3S-H | Al+1.2% Mn. |
| 17S-T | Al+4.0% Cu+0.5% Mn+0.5% Mg. |
| 24S-T | Al+4.5% Cu+0.6% Mn+1.5% Mg. |
| 52S-O | Al+2.5% Mg+0.25% Cr. |
| 52S-H | Al+2.5% Mg+0.25% Cr. |
| 53S-W | Al+0.7% Si+1.3% Mg+0.25% Cr. |
| 53S-T | Al+0.7% Si+1.3% Mg+0l25% Cr. |
| 61S-W | Al+0.25% Cu+0.6% Si+1.0% Mg+0.25% Cr. |
| 61S-T | Al+0.25% Cu+0.6% Si+1.0% Mg+0.25% Cr. |
| 56S | Al+5.25% Mg+0.1% Mn+0.1% Cr. |
| Alclad 3S-O | A duplex product made of a 3S core with a coating of 72S (Al+1% Zn) on one or both sides. |
| Alclad 3S-H | Do. |
| Alclad 17S-T | A duplex product made of a 17S-T core and coatings of aluminum on one or both sides. |
| Alclad 24S-T | A duplex product made of a 24S-T core and coatings of aluminum on one or both sides. |

It is necessary to space the cathode and anode from one another. To accomplish this, it is preferred to insert a separator between the anode and the cathode regardless of configuration, although other methods of spacing may be used. The separator may be any porous material such as kraft paper, kraft paper treated with a gel-like material such as carboxymethylcellulose, polyvinyl alcohol, or a starch-flour gel. The coating on the kraft paper promotes adhesion of the paper to the anode and maintains good electrical contact between the electrolyte and the anode. Porous ceramics or other inorganic or organic structures may be used in place of paper.

The electrolyte

The electrolyte may be an aqueous solution containing a soluble salt such as a metal halide. Sea water may be utilized, or water to which one or more soluble salts have been added. The particular electrolyte selected for a given application depends inter alia on the anode material. For example, with zinc anodes, the electrolyte may consist of an aqueous solution of ammonium chloride and zinc chloride.

With magnesium anodes, the electrolyte may be a water solution of bromides of ammonium, alkali metals, and alkaline earth metals. The electrolyte may be prepared by dissolving the salt, for example, magnesium bromide, in water in a concentration ranging from about 30 grams per liter to the concentration required to produce a saturated solution at ordinary temperatures. The concentration does not appear to be critical, although for best results certain concentrations are to be preferred depending upon the particular salt or combination of salts being used. For example, preferred concentrations of the alkali metal bromides (hydrated) are from about 150 to 600 grams, and preferably 500 grams, of the salt per liter of water. While a single salt may be used as the electrolyte, combinations of salts, particularly combinations of alkali metal bromides or with alkaline earth metal bromides are preferable. Examples of soluble salts that may be added to the electrolyte are lithium bromide, sodium bromide, magnesium bromide, magnesium chloride, strontium bromide, calcium bromide, and ammonium bromide.

It is also desirable to include in the electrolyte one or more salts of chromic acid in sufficient amounts to inhibit corrosion. Suitable chromic acid salts are those of the alkali metals, the alkaline earth metals, and ammonium. The chromic acid salts may be used in proportions between .01 grams per liter of solution up to concentrations producing saturation in the presence of the dissolved salt. A preferred concentration of hydrated lithium chromate is about .05 to 2.0 grams per liter of solution. Examples of corrosion inhibiting salts are sodium chromate, ammonium chromate, potassium dichromate, lithium dichromate, magnesium chromate, calcium chromate, and barium chromate. Mixtures of the chromates may also be used.

For certain applications, principally where a long shelf life is required, it is desirable to omit one of the essential components until the need for electrical energy arises. The primary cells of the invention are particularly adaptable to preparation as reserve cells, for example, by omitting the electrolyte until just prior to use. In reserve cells the more corrosive electrolytes may be utilized.

With aluminum anodes, the electrolyte may be an aqueous solution of aluminum chloride. Bromides and chlorides of alkali metals, alkaline earth metals, aluminum, and manganese are suitable soluble salts in the electrolyte. Examples of soluble salts that may be added to the electrolyte are zinc chloride, manganese chloride, magnesium chloride, aluminum chloride, ammonium chloride, and alkali metal chlorides, such as potassium chloride, and calcium chloride. It is also desirable to include corrosion-inhibiting amounts of chromic acid salts in the electrolyte.

*The cathode*

The cathode includes an organic oxidizing substance in which the oxidizing properties are due at least in part to chemically combined polyvalent iodine. It should be noted that in all these substances the iodine is always directly bonded to a carbon atom and is always in a positive oxidation state. The class of substances used in this invention is thus distinguished from the materials known as positive N-halogen compounds, or N-halogen compounds, in which the halogen is always bonded to a nitrogen atom. The organic iodine oxidants which are utilized as depolarizers in this invention may be grouped as: A. iodoso compounds; B. iodoxy compounds; C. iodyl salts. During the operation of the cell, an electrochemical reaction reduces the organic iodine compound as the cell furnishes the electric current.

The following list gives examples of organic polyvalent iodine compounds which are useful in the primary cells of the invention. It will be understood that the list is representative but not exhaustive, since hundreds of such compounds are known, together with derivatives of most of them.

A. Iodoso compounds:
  1. Iodosoethylene and derivatives
  2. Chloro-3-iodosopropionic acid and derivatives
  3. 1-iodosobutadiene and derivatives
  4. Iodosobenzene and derivatives
     (a) 2-nitro-iodosobenzene
  5. Iodosonaphthalenes and derivatives
  6. 1-iodoso-anthraquinone and derivatives
  7. 1,3 diiodosobenzene
  8. 1,2,4-tri-iodosobenzene
  9. Iodosopyridine and derivatives
  10. Iodosoquinoline and derivatives
B. Iodoxy compounds:
  1. 1-chloro-2-iodoxyethylene
  2. Monoiodoxybenzene and derivatives
     (a) 3-nitro-iodoxybenzene
  3. Monoiodoxynaphthalene and derivatives
  4. Monoiodoxyanthraquinone and derivatives
  5. 1,3-diiodoxybenzene and derivatives
  6. 8-methyl-2-iodoxyquinoline and derivatives
C. Iodyl salts:
  1. Diphenyliodyl acetate Any organic polyvalent iodine compound may be used in the cathodes of the primary cells of this invention. The primary cells of the invention all utilize the electron change obtained by converting to a negative iodine ion an iodine atom which has a positive valence and is bonded to carbon. This is shown schematically by the following equations:

for iodoso compounds of the type RIO in which the valence of iodine is $+1$, $$I^+ + 2e \rightarrow I^-$$

for iodoxy compounds of the type $RIO_2$, in which iodine has a valence of $+3$, $$I^{+++} + 4e \rightarrow I^-$$

for iodyl compounds of the type $(R_2IO)^+ (ROO)^-$, where iodine has a valence of $+1$, $$I^+ + 2e \rightarrow I^-$$

Some of the organic polyvalent iodine compounds containing iodine in an oxidation state of $+1$ or greater which are relatively insoluble in conventional electrolytes are particularly suitable as cathode materials in dry cells. Some of these organic iodine compounds may be soluble in the cell electrolyte. These substances may be used in reserve cells.

In addition, such compounds may have other radicals in their structure which alter their physical and chemical properties to affect their stability and solubility in the electrolyte. It is also recognized that by changing the structure of the organic iodine compounds, the theoretical capacity, shelf life and the rate at which electrical energy can be withdrawn from the cell can be altered. The selection of the particular compound and its structure will depend on the application for which the particular primary cell is intended. The utility of the organic iodine compound may be further enhanced by the presence of oxidizing radicals such as nitro, azo, etc. groups that will increase the theoretical capacity. The cathodes of the primary cells of the invention may also comprise a mixture of one or more organic iodine compounds, or a mixture with one or more other organic oxidizing compounds, such as quinones, or certain organic azo compounds, or with inorganic cathode materials such as manganese dioxide or the like.

The cathodes of the invention may be fabricated by a number of methods and in various shapes. For example, a mixture of powdered cathode materials with the electrolyte may be prepared, and then a quantity of the mixture may be pressed to the desired shape and density. The cathode mix may also if desired include an inert binder such as polyvinyl alcohol, carboxymethylcellulose, methylcellulose, a vinyl resin, bentonite or silica gel. Such mixtures may be pressed as described above or cast to fabricate the cathode.

The presence of atmospheric oxygen enhances the capacity of the cathode of cells of various kinds. For example, capacity increases can be realized in the cells of Figure 1 by providing a small vent (e.g., 0.05 inch in diameter) in the wax layer 16. This may be done by preparing a tab (not shown) on the washer 15, which tab extends up through the wax seal 16. The maximum effect of the atmospheric oxygen is ordinarily obtained when the current drain is relatively light.

The following examples may be prepared and the cells constructed and arranged according to the techniques and methods set forth in the description of Example I. Many variations in the anode, cathode, and electrolyte materials are possible and these possibilities are demonstrated by the following examples.

EXAMPLE II

A dry cell utilizing an iodoso compound, and constructed with an AZ10A magnesium anode substantially as the cell of Example I as shown in Figure 1, may be prepared with a cathode mix as follows:

7.0 grams o-iodosobenzoic acid
3.5 grams Cabot Battery Black
0.6 gram barium chromate
8 ml. of an electrolyte consisting of an aqueous solution containing 371 grams $MgBr_2 \cdot 6H_2O$ and 1 gram $Li_2CrO_4 \cdot 2H_2O$ per liter of water The bobbin weight in this example is also 4.5 grams.

EXAMPLE III

A dry cell coupling an iodoxy compound cathode with an aluminum anode was prepared substantially similar to the cell shown in Figure 1. The anode is a cup of aluminum alloy. The alloy is a duplex product comprising an outer layer with the composition 95.5% aluminum, 3% magnesium, 1% zinc and 0.5% manganese; and an internal layer of super-purity aluminum which comprises 70% by weight of the duplex product. This duplex alloy composition is sometimes designated Al–M–373. The available aluminum cup size has an internal diameter of .544 inch, and is therefore slightly larger than the anodes of Examples I and II, which have an internal diameter of .500 inch.

The cathode mix consists of:

10 grams iodoxybenzene
5 grams Cabot Battery Black
0.9 gram barium chromate
19 ml. of electrolyte consisting of 2M solution of aluminum chloride in water The weight of the bobbin was 7 grams.

EXAMPLE IV

Another dry cell in accordance with the invention utilizing an M–373 aluminum alloy anode together with an iodoso compound is constructed substantially similar to the cell of Example III, with a cathode mix as follows:

10 grams o-iodosobenzoic acid
5 grams Cabot Battery Black
0.9 gram barium chromate
15 ml. of electrolyte consisting of 2M solution of aluminum chloride in water The weight of the bobbin was 7 grams.

EXAMPLE V

An "AA" size dry cell may be constructed substantially similar to the cell of Example I, but using a zinc cup as anode, and a cathode mix as follows:

7 grams iodoxybenzene
14 grams Darco G–60 Carbon Black
23 ml. of an electrolyte consisting of 25 parts ammonium chloride, 20 parts zinc chloride, and 55 parts water by weight Nibroc salt-free paper is used as the separator. The bobbin weight may be 7.5 grams.

Referring to Figure 2, curve 22 shows a characteristic discharge curve at 4 ohm drain for a cell prepared according to Example III. Curve 23 shows the characteristic discharge curve at 4 ohm drain for a cell prepared according to Example IV. For comparison, a "AA" size prior art cell is shown in curve 25 when discharged under the same conditions. It will be noted that the dry cells according to the invention exhibit a higher operating voltage and a longer lifetime to an 0.9 volt cutoff than the prior art cell. Thus the dry cell according to Example III exhibits, at 4 ohm drain, a higher operating voltage, a flatter discharge curve, and a lifetime more than three-fold that of the comparable conventional Leclanche cell of curve 25. It is obvious from the curves that the cells according to the invention have a greater capacity in watt-hours per unit of volume than the Leclanche cell. Since these cells are also lighter than the Leclanche cell, their superiority per unit of weight is even greater.

Figure 3:
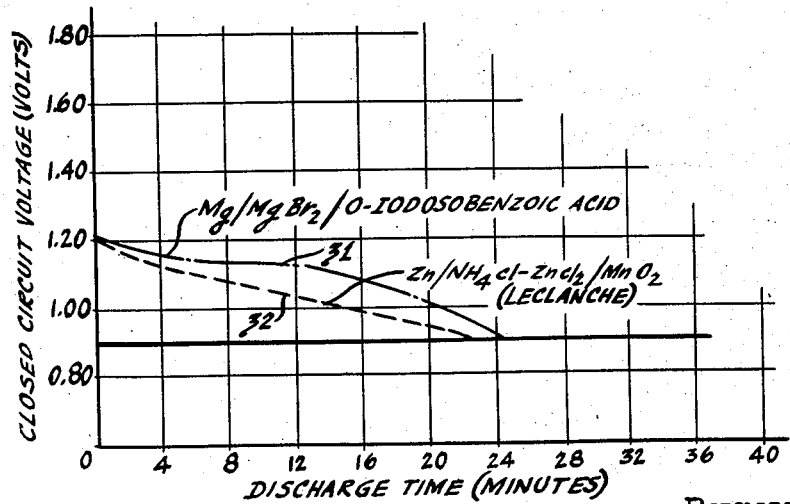
Figure 3 is a set of curves showing the discharge characteristics of another "AA" size dry cell of the invention, together with a comparable prior art dry cell, when discharged continuously through a four ohm resistance.

Referring to Figure 3, curve 31 is the discharge curve at 4 ohm continuous drain of a cell prepared according to Example II. For comparison, curve 32 is the discharge curve of a comparable prior art Leclanche cell under the same conditions. The dry cell of Example II exhibits a higher operating voltage, a longer lifetime to an 0.9 volt cutoff, and a flatter curve.

Figure 4:
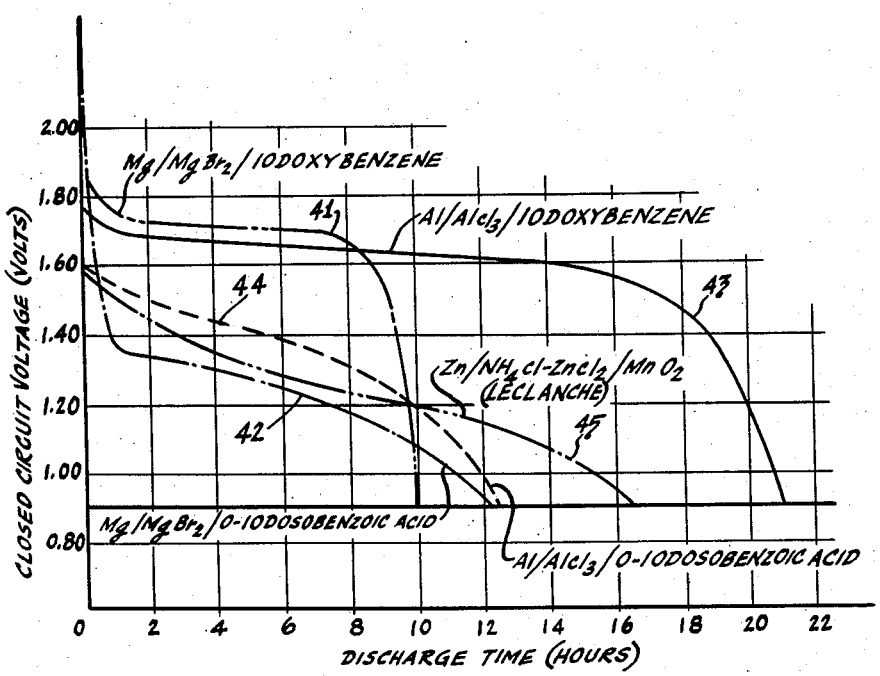
Figure 4 is a set of curves showing the discharge characteristics of the four dry cells of Figures 2 and 3, together with the same prior art dry cell, when discharged continuously through a fifty ohm resistance.

In Figure 4 the dry cells of Examples I through IV inclusive are compared for hours of service at 50 ohm drain to an 0.9 volt cutoff. Curve 41 is the characteristic discharge curve for a cell prepared according to Example I. Curve 42 is the characteristic discharge curve under the same conditions for a cell prepared according to Example II. Similarly, curves 43 and 44 are the discharge curves at 50 ohm drain for cells prepared according to Examples III and IV, respectively. For comparison, curve 45 shows the discharge curve of a conventional commercial Leclanche cell under the same conditions. All the cells according to the invention have a higher initial voltage than the Leclanche cell. It will be noted that the dry cell according to Example III exhibits a longer lifetime and a much flatter discharge curve than the comparable conventional zinc/manganese dioxide cell.

Figure 5:
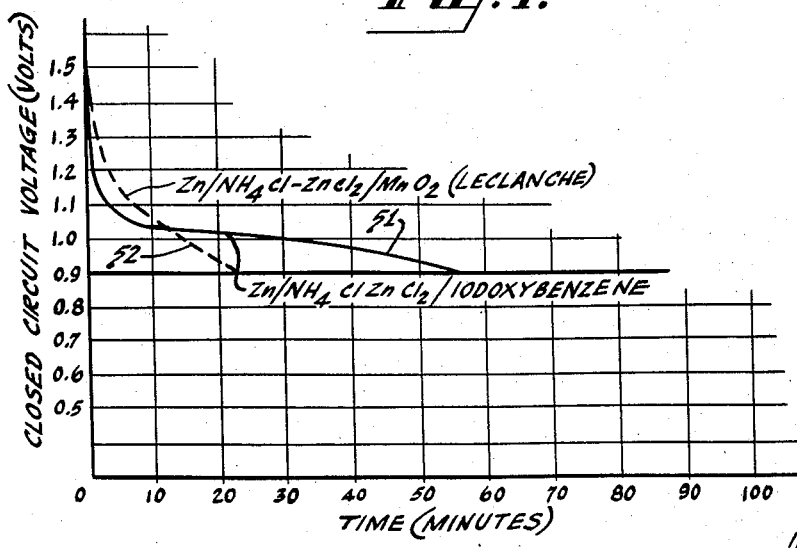
Figure 5 is a curve showing the discharge characteristic of another "AA" size dry cell of the invention, together with a comparable prior art dry cell, when discharged through a four ohm resistance.

Referring to Figure 5, curve 51 is the discharge curve at 4 ohm continuous drain of a cell prepared in accordance with Example V. For comparison, curve 52 is the characteristic discharge curve of a commercial Leclanche cell under the same conditions. The dry cell of the invention exhibits a flatter operating voltage and a longer lifetime than the comparable prior art cell.

There has thus been described an improved electrochemical system which may be employed in primary and reserve cells. There have also been described improved primary cells which may be made of non-strategic materials and which exhibit a relatively flat operating voltage level over a wide range of current drains.

What is claimed is:

1. In a primary cell, the combination of an anode selected from the group consisting of magnesium, aluminum, and zinc, with a cathode including a depolarizer consisting of an organic oxidizing substance in which the oxidizing properties of said substance are due at least in part to polyvalent iodine in a positive oxidation state chemically combined to a carbon atom in said substance.

2. In a primary cell, the combination of a magnesium anode with a cathode including a depolarizer consisting of an organic oxidizing substance in which the oxidizing properties of said substance are due at least in part to polyvalent iodine in a positive oxidation state chemically combined to a carbon atom in said substance.

3. In a primary cell, the combination of an aluminum anode with a cathode including a depolarizer consisting of an organic oxidizing substance in which the oxidizing properties of said substance are due at least in part to polyvalent iodine in a positive oxidation state chemically combined to a carbon atom in said substance.

4. In a primary cell, the combination of a zinc anode with a cathode including a depolarizer consisting of an organic oxidizing substance in which the oxidizing properties are due at least in part to polyvalent iodine in a positive oxidation state chemically combined to a carbon atom in said substance.

5. In a primary cell, the combination of an anode selected from the group consisting of magnesium, aluminum, and zinc, with a cathode comprising a mixture of different organic substances in which the oxidizing properties of at least one of said substances are due at least in part to polyvalent iodine in a positive oxidation state chemically combined to a carbon atom in said substances.

6. A primary cell according to claim 1 wherein said cathode includes an inorganic depolarizer.

7. A primary cell according to claim 1 wherein said cathode includes an inorganic material for increasing the electrical conductivity of said cathode.

8. A primary cell comprising a magnesium anode, an electrolyte, and a cathode including a depolarizer consisting of an organic oxidizing substance in which the oxidizing properties of said substance are due at least in part to polyvalent iodine in a positive oxidation state chemically combined to a carbon atom in said substance.

9. A primary cell according to claim 8, wherein said electrolyte is essentially an aqueous solution of magnesium bromide.

10. A primary cell according to claim 9, wherein said electrolyte has dissolved therein an inhibitor selected from the group consisting of the chromates of ammonium, the alkali metals and the alkaline earth metals.

11. A primary cell comprising an aluminum anode, an electrolyte, and a cathode including a depolarizer consisting of an organic oxidizing substance in which the oxidizing properties of said substance are due at least in part to polyvalent iodine in a positive oxidation state chemically combined to a carbon atom in said substance.

12. A primary cell according to claim 11, wherein said electrolyte is essentially an aqueous solution of aluminum chloride.

13. A primary cell according to claim 12, wherein said electrolyte has dissolved therein an inhibitor selected from the group consisting of the chromates of ammonium, the alkali metals, and the alkaline earth metals.

14. A primary cell comprising a zinc anode, an electrolyte, and a cathode including a depolarizer consisting of an organic oxidizing substance in which the oxidizing properties of said substance are due at least in part to polyvalent iodine in a positive oxidation state chemically combined to a carbon atom in said substance.

15. A primary cell according to claim 14, wherein said electrolyte is essentially an aqueous solution of ammonium chloride and zinc chloride.

16. A primary cell according to claim 15, wherein said electrolyte has dissolved therein an inhibitor selected from the group consisting of the chromates of ammonium, the alkali metals, and the alkaline earth metals.

17. A primary cell including a magnesium anode, an aqueous electrolyte, and a cathode including iodoxybenzene.

18. A primary cell including an aluminum anode, an aqueous electrolyte, and a cathode including iodoxybenzene.

19. A primary cell including a zinc anode, an aqueous electrolyte, and a cathode including iodoxybenzene.

20. A primary cell including a magnesium anode, an aqueous electrolyte, and a cathode including iodosobenzene.

21. A primary cell including an aluminum anode, an aqueous electrolyte, and a cathode including iodosobenzene.

22. A primary cell including a zinc anode, an aqueous electrolyte, and a cathode including iodosobenzene.

23. A primary cell including a magnesium anode, an aqueous electrolyte, and a cathode including o-iodosobenzoic acid.

24. A primary cell including an aluminum anode, an aqueous electrolyte, and a cathode including o-iodosobenzoic acid.

25. A primary cell including a zinc anode, an aqueous electrolyte, and a cathode including o-iodosobenzoic acid.

References Cited in the file of this patent

Beilsteins Handbuch Der Organische Chemie, Verlag Von Julius Springer, Berlin, ed. 4, 1922, Band 5, page 218.

UNITED STATES PATENT OFFICE

CERTIFICATE OF CORRECTION

Patent No. 2,897,249                                    July 28, 1959

Richard Glicksman et al.

It is hereby certified that error appears in the printed specification of the above numbered patent requiring correction and that the said Letters Patent should read as corrected below.

Column 4, line 49, Table II, second column thereof, tenth item, for that portion opposite "53S-T" reading "0125% Cr." read -- 0.25% Cr. --.

Signed and sealed this 15th day of December 1959.

(SEAL)
Attest:

KARL H. AXLINE
Attesting Officer

ROBERT C. WATSON
Commissioner of Patents